United States Patent [19]

Abbey, III

[11] Patent Number: 5,868,299
[45] Date of Patent: Feb. 9, 1999

[54] METHOD AND APPARATUS FOR MAINTAINING SEAM ALIGNMENT IN SEAM WELDED TUBES

[75] Inventor: Nelson D. Abbey, III, Montclova, Ohio

[73] Assignee: Abbey Etna Machine Company, Perrysburg, Ohio

[21] Appl. No.: 851,326

[22] Filed: May 5, 1997

[51] Int. Cl.[6] .................................................. B23K 101/06
[52] U.S. Cl. ........................ 228/147; 228/17.5; 228/158
[58] Field of Search .................................... 228/17.5, 147, 228/158; 219/59.1, 61, 61.11; 29/33 D, 33 T

[56] References Cited

U.S. PATENT DOCUMENTS

| | | | |
|---|---|---|---|
| 3,640,116 | 2/1972 | Hellman | 219/61.1 |
| 3,691,337 | 9/1972 | Morris | 219/61.3 |
| 3,707,257 | 12/1972 | Wogerbauer et al. | 228/17.5 |
| 5,309,746 | 5/1994 | Abbey, III | 72/9 |

*Primary Examiner*—Samuel M. Heinrich
*Attorney, Agent, or Firm*—Donald R. Fraser

[57] ABSTRACT

The invention comprises a method and apparatus for maintaining seam alignment in seam welded tubes comprising the tube being formed to be advanced through a shaping station after seam welding and prior to the cooling of tube wherein the tube is preformed to commence to assume at least two continuously extending flat shaped surfaces parallel with the continuous seam and contacting the preformed tube subsequent to the cooling to maintain alignment of the weld seam.

2 Claims, 2 Drawing Sheets

METHOD AND APPARATUS FOR MAINTAINING SEAM ALIGNMENT IN SEAM WELDED TUBES

BACKGROUND OF THE INVENTION

1. Field of the Invention

The present invention relates generally to the manufacture of continuous seam-welded metal tubes or pipes, and more particularly to a system for obtaining the axial alignment of the weld seam in seam welded pipe or tube.

2. Description of the Prior Art

In accordance with a well-known procedure for fabricating seam-welded pipes and tubes, a continuous strip or skelp is advanced through a forming apparatus and progressively deformed into a tubular form having an open, longitudinally extending seam. The tubular form then advances through a welding station wherein the adjacent longitudinal free edges are urged together and joined by a suitable welding process. The particular process to be employed will generally be dictated by, among other factors, the material from which the tube or pipe is formed. For example, the pipe may be formed of low carbon steel, stainless steel, aluminum, etc., and the welding process may include any of the well-known welding techniques conventionally employed with the various materials. In a widely used embodiment the tube or pipe is heated by electrical induction so that the edges achieve fusion temperature, and the heated edges are urged into engagement to produce a continuous monolithic welded seam.

Following the welding step, the pipe or tube may advance through a scarfing unit for removal of the raised bead created incident to the formation of the welded seam, and then through a series of sizing rolls for imparting the precise diameter and cross-sectional configuration to the formed pipe. Finally, after the continuous pipe has been sized and cooled, it enters a cut-off mechanism wherein it is cut into sections of appropriate length.

Due, among other factors, to residual stresses in the material following formation of the pipe, and the heating and cooling incident to the welding of the seam, the pipe may tend to warp or snake and develop an undesirable non-linear configuration as it exits the constraints of the forming and welding mechanism. In order to minimize the amount of this curvature in the finished product, the pipe or tubing is directed through a straightening unit wherein appropriate forces are applied by straightening rolls to bend the pipe to compensate for existing curvature and cause it to assume a linear profile as it exits the forming apparatus. Heretofore, the pipe has been observed at some distance downstream from the straightening unit by an operator to visually determine the amount and orientation of existing curvature, and the straightening unit is then manually adjusted in response to the observed condition to compensate for the curvature. The procedure functions well for its intended purpose, and permits production of pipe of good quality. However, it has not been found entirely satisfactory in that it is dependent upon the operator's visual observation and subsequent manual adjustment of the straightening unit. It is thus subject to the operator's judgment, as well as human error. In addition, deviation of the pipe is best observed at some distance downstream from the straightening unit, typically in the cutoff area. Since the pipe advances at a relatively rapid rate, a significant amount of defective pipe may be produced between the time at which deviation is noted and corrective action can be taken at the straightening unit.

Also, the prior art has provided, as in U.S. Pat. No. 5,309,746 issued in the name of Nelson D. Abbey III, an alignment sensor immediately downstream from the straightening unit for continuously precisely determining the position of the advancing pipe relative to reference axes. Signals indicative of the observed position of the pipe relative to a predetermined desired position are generated, and the straightening unit is adjusted in response to the generated signals to shape the pipe so that it advances through the alignment sensor at the desired position.

In order to further insure the straightness of the pipe being produced, following severing of the continuous pipe into individual sections, some or all of the individual sections may be checked for straightness. The straightening unit is adjusted in response to observed deviations from straightness to insure that the finished product is within precise limits of axial straightness. To that end, following severance from the continuous pipe the individual pipe sections are received on a deflection checker. The section is rotated about its longitudinal axis to position the weld seam at a predetermined position for reference purposes by means of a seam locator. With the seam position thus determined, deviation from straightness of the mid region of the pipe section is determined along orthogonal axes. Signals indicative of the direction and magnitude of deflection, or bow, are generated and transmitted to the straightening unit. The straightening unit is adjusted in response to the signals so as to correctly shape the continuous pipe to eliminate, or at least minimize, any deflection or bow in subsequent individual sections.

The formation of a continuous seam welded tube which is straight and the longitudinally extending seam is maintained in continuous direct alignment is a major objective of the present invention.

SUMMARY OF THE INVENTION

In accordance with the present invention, the various complexities and deficiencies of the prior art are eliminated by a method and apparatus for forming a continuous seam welded tube from a continuous strip progressively deformed into a tubular form having a longitudinally extending continuous seam which is caused to be advanced through a welding station wherein the adjacent free edges of the strip are urged together and joined by a welding process to form a tube having a continuous seam and a circular outer cross-sectional configuration, the improvement comprising the step of causing the tube to be advanced through a shaping station prior to the cooling of the tube wherein the tube is caused to commence to assume at least two continuously extending flat shaped surfaces parallel with the continuous seam and finally causing the shaped tube to pass through a cooling station and thence through the final squaring and sizing stations wherein the continuous seam extends along a straight axial path.

BRIEF DESCRIPTION OF THE DRAWINGS

The above method and apparatus for achieving the objects and advantages of the invention will become readily apparent to those skilled in the art, from reading the following detailed description of a preferred embodiment of the invention when considered in the light of the accompanying drawings, in which.

DESCRIPTION OF THE PREFERRED EMBODIMENT OF THE INVENTION

Square and other rectangular cross-sections can be feasibly produced by reshaping the round tubing. the reshaping can be accomplished either continuously in sequence with the production of the round tubing mentioned above, or in a separate operation. This invention deals with the sequential formation of a square, rectangular, or other polyangular cross-sectional configurations, as well as round cross-sectional configuration.

On square or rectangular tubing, the flatness of the sides will vary with the thickness and hardness of the metal being worked. On light gages and in harder tempers, spring back of the metal being formed results in a crown effect on the sides of the tubing being formed. This condition can be corrected by overforming in the final section. In forming rectangular cross-sectional configured tubing, the longer sides may become convex, and the short sides may become concave. Flatness can be typically controlled to a minor extent by adjustments in rolls of the finish stations, but a major correction must be made by using concave or convex contours in the final straightening stations.

Also, it is well known that as the thickness and/or complexity of the shape of the stock increases; more stations are required.

In addition to the cross-sectional configuration and length tolerances, another tolerance to consider is the straightness of the material and the formed section. Amongst the parameters that determine the straightness include camber, curve or sweep, bow, and twist. The terms camber, curve, or sweep are often used synonymously when describing straightness. The horizontal and vertical planes of the formed tubing are determined by the position in which the tube is formed.

The following definitions may be found to be helpful:

Camber—The deviation of a side edge from a straight line. Excessive camber contributes to curve, bow, and twist in the formed tube.

Curve or Sweep—The deviation from a straight line in the horizontal plane measured after the tube is formed. Curve or sweep can result from incorrect horizontal roll adjustment and uneven forming pressure in a pair of cooperating forming rolls.

Bow—The deviation from a straight line in the vertical plane and can be either cross bow or longitudinal bow. Bow results from uneven vertical gaps on symmetrical sections and from uneven forming areas on unsymmetrical sections.

Twist—The deviation from a straight line in the direction of a helix and resembles a corkscrew. Twist results from excessive forming pressure.

Figure 1:
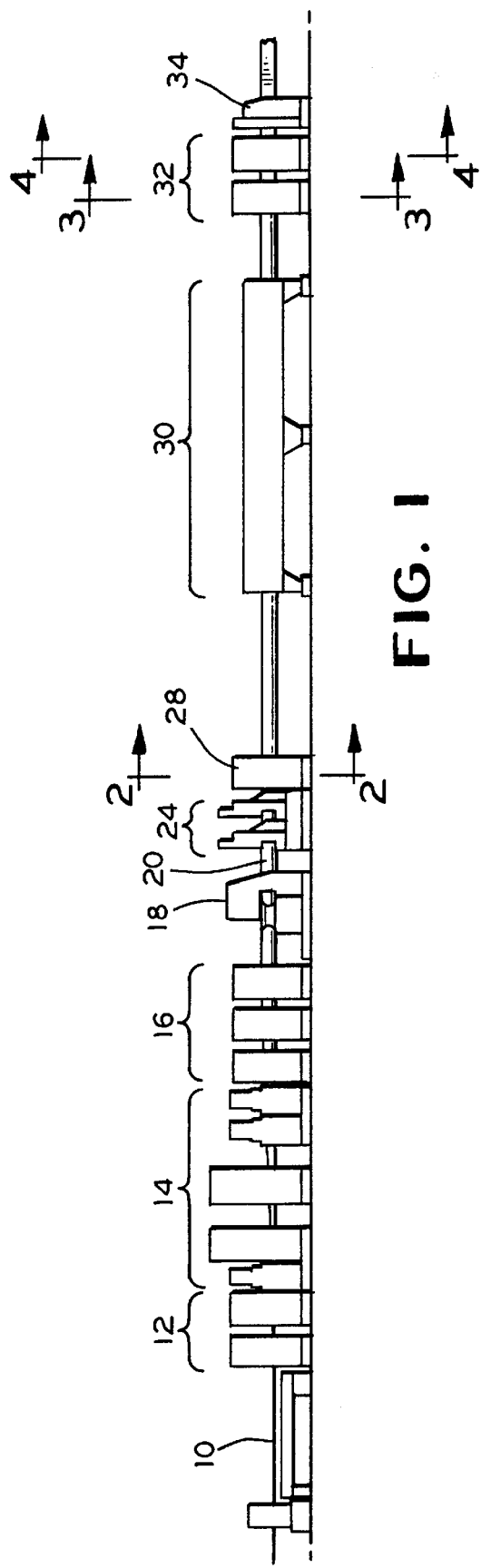
FIG. 1 is a schematic side elevational view of a portion of tube mill for producing continuous seam welded tube or pipe embodying the features of the invention.

With reference to FIG. 1, there is shown schematically a portion of a conventional tube forming mill embodying the features of the present invention. In such mills, as described, for example, in U.S. Pat. No. 5,148,960, a continuous metal strip or skelp is advanced through a series of opposed forming rolls and side closing rolls whereby it is progressively bent into tubular form. The formed tube is then advanced through a welding station wherein the opposed free edges of the formed strip of metal are suitably fused together and welded or fused to produce a continuous tube having a continuous weld seam. Thereafter, the tube is cooled and caused to advance through a series of squaring and sizing rolls for final working and sizing prior to being cut into predetermined lengths by a cooperating flying cut-off mechanism.

More specifically, the invention as illustrated in FIG. 1 is a schematic disclosure of a tube mill modified to incorporate the novel features of the invention. FIG. 1 shows a continuous metal strip or skelp 10 which is caused to be advanced through a series of metal deforming stations including a break-down station 12 wherein the metal strip 10 is initially deformed or bent from a flat cross-section to a curved cross-section. After passing through the break-down station 12, the strip is progressively bent into a tubular form. The bending operation includes a transition beam station 14 which is comprised of a series of beam mounted forming roll assemblies which progressively apply pressure to the strip 10 to cause the same to approach a tubular form.

The shaped or formed strip 10 leaves the transition beam station 14 and is caused to enter a fin roll station 16 which typically includes driven forming rolls with a series cooperating idle fin rolls adapted to maintain alignment of the outer free edges of the strip 10 prior to the juncture of the edges with one another. The formed tube is then welded or fused together in a weld pressure station 18 to produce a continuous tube 20 having a seam weld 22 which generally has an integral outside and inside bead. The outside bead is typically removed as the completed tube 20 is caused to pass through a scarfing station 24.

Normally, the continuous tube 20, typically round in cross-section, is advanced through a cooling zone 30 and thence to the various sequentially arranged sizing and squaring stations 32, a Turkshead straightening station 34, and finally to a cutoff station (not shown) where the continuous tube 20 is cut into predetermined lengths by flying cut-off mechanism. It is during the latter portion of the tube mill operation after the formed tube 20 exits the weld pressure station 18 that the formed tube 20 tends to twist or bow causing the weld seam 22 to drift from a straight aligned path of travel. Due to the wandering of the weld seam, the finished product is not consistent in the location of the weld seam and, therefore, may be subject to rejection by the customer.

However, it has been found that by placing a squaring station 28 at the outlet of the scarfing station 24 and upstream of the cooling zone 30, the aforesaid problems can be substantially overcome. More specifically, it has been found that by reshaping the continuous tube 20 as it emerges from the welding and scarfing stations and prior to its entry into the cooling zone, the position of the weld seam 22 can be controlled.

Figure 5:
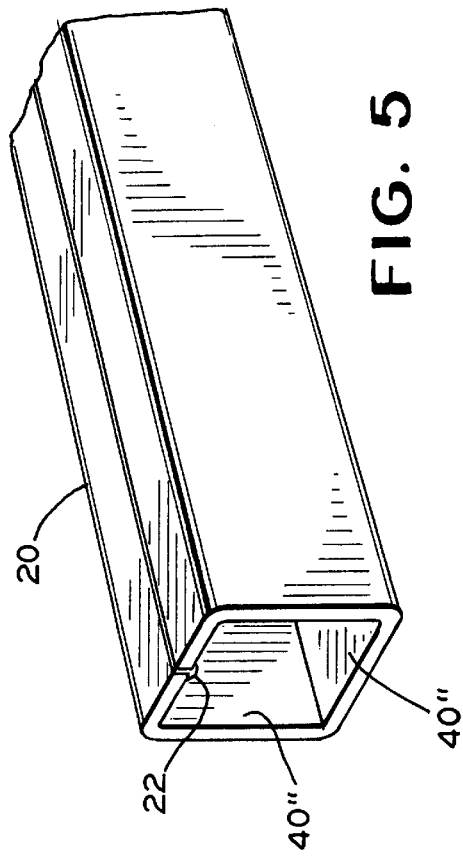
FIG. 5 is an enlarged fragmentary perspective view of a continuous seam welded tube produced by the method and apparatus of the invention.
Figure 3:
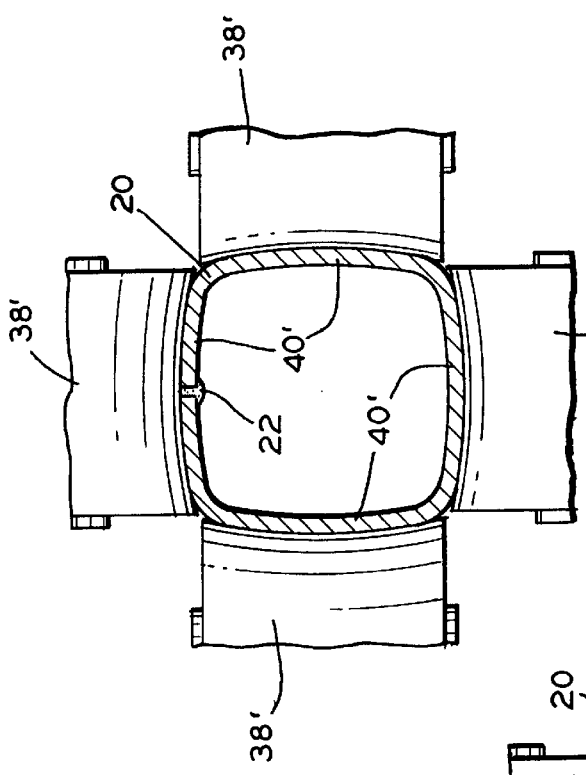
FIG. 3 is an enlarged transverse sectional view taken along line 3—3 of FIG. 1.
Figure 4:
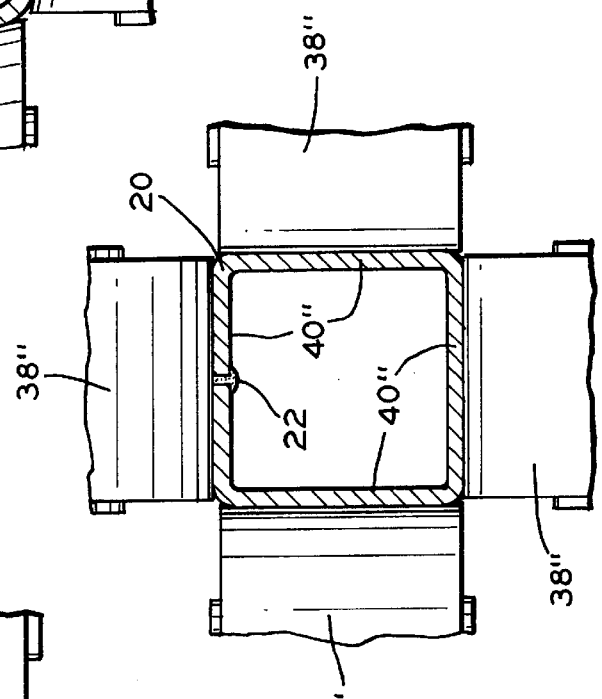
FIG. 4 is an enlarged transverse sectional view taken along line 4—4 of FIG. 1.
Figure 2:
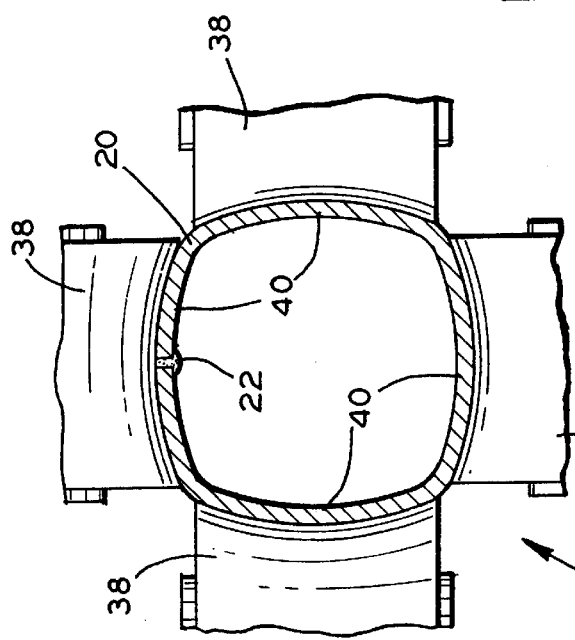
FIG. 2 is an enlarged transverse sectional view taken along line 2—2 of FIG. 1.

FIG. 2 shows a typical forming roll assembly 28. The forming roll assembly 28 includes cooperating roll members 38 having concave roll forming surfaces. The tube 20 enters the forming roll assembly 28 at an elevated temperature, typically in the range of from ° C. to −° C. The roll members 38 are contoured to, in effect, preform the round cross-section of the tube 20 while the metal of the tube is at an elevated temperature. Therefore, the preforming operation requires less energy than would be required to cold form the tube. The preformed tube 20, now having four walls 40 of increased radii when compared with the tube 20 as it emerged from the scarfing station 24, is then passed through the cooling zone 30 where the temperature of the transient tubing is reduced to a range of from ° C. to −° C. The cooled preformed tube 20 is caused to pass through the first set of cooperating forming roll members 38' of the squaring and sizing station 32. The forming roll members 38' have concave roll forming surfaces which cause the preformed tube 20 to assume the cross-sectional configuration as illustrated in FIG. 3 wherein the walls 40' are formed of increased radii and are approaching a flat contour The tube 20 is then caused to pass through the second set of cooperating forming roll members 38" of the squaring and sizing station 32. The forming roll members 38" having substantially flat forming surfaces which cause the transient preformed tube 20 to assume a rectangular cross-sectional configuration as illustrated in FIGS. 4 and 5. The formed tube 20 is then caused to pass through a straightening station 34 prior to being cut into predetermined lengths.

It has been found that the above equipment can satisfactorily and economically produce tubing wherein the location of the weld seam is maintained in continuous straight alignment along the longitudinal length of the tubing.

While the illustrated embodiment of the invention is directed to the production of a tube of square cross-sectional configurations, it will be understood that the finished tube can assume a number of other shapes.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A method for forming a continuous seam welded tube from a continuous strip progressively deformed into a tubular form having a longitudinally extending continuous seam which is caused to be advanced through a welding station wherein the adjacent free edges of the strip are urged together and joined by a welding process to form a tube having a continuous seam and a circular outer cross-sectional configuration, the improvement comprising the steps of:

a) causing the tube to be advanced through a shaping station after seam welding and prior to the cooling of the tube wherein the tube is caused to commence to assume at least two continuously extending flat shaped surfaces parallel with the continuous seam;

b) causing the shaped tube to pass through a cooling station; and c) causing the cooled shaped tube to pass through the final squaring and sizing stations wherein the continuous seam extends along a straight axial path.

2. Apparatus for forming a continuous seam welded tube from a continuous strip progressively deformed into a tubular form having a longitudinally extending continuous seam which is caused to be advanced through a welding station wherein the adjacent free edges of the strip are urged together and joined by a welding process to form a tube having a continuous seam and a circular outer cross-sectional configuration, the improvement comprising a forming station including roll forming members disposed downstream of the welding station and prior to substantial cooling of the tube wherein the tube is caused to commence to assume at least two continuously extending flat shaped surfaces parallel with the continuous seam; a cooling station; and final squaring and sizing stations wherein the continuous seam extends along a straight axial path.

* * * * *